United States Patent [19]

Thomas

[11] Patent Number: 4,986,606
[45] Date of Patent: Jan. 22, 1991

[54] AUTOMOBILE MEDALLION ANTI-THEFT LOCKING DEVICE

[76] Inventor: John V. Thomas, 665 Park Dr., Barrington, Ill. 60010

[21] Appl. No.: 355,998

[22] Filed: May 23, 1989

[51] Int. Cl.⁵ .................................................. B60B 7/06
[52] U.S. Cl. .............................. 301/108 R; 301/37 CM
[58] Field of Search ............ 301/37 R, 37 AT, 108 R, 301/108 A, 108 SC; 70/259

[56] References Cited

U.S. PATENT DOCUMENTS

| 4,040,672 | 8/1977 | Imahashi | 301/108 S X |
| 4,067,621 | 1/1978 | Reppert | 301/108 SC X |
| 4,818,032 | 4/1989 | Thomas | 301/108 R X |

FOREIGN PATENT DOCUMENTS

| 2511304 | 2/1983 | France | 301/37 R |
| 0057001 | 4/1984 | Japan | 301/37 R |

Primary Examiner—Russell D. Stormer
Attorney, Agent, or Firm—Silverman, Cass & Singer, Ltd.

[57] ABSTRACT

Anti-theft locking device for securing a wheel medallion having a grease cap well to the wheel of a vehicle. The device is utilized with a conventional wheel medallion of the type having spring retainers that protrude from the body of the medallion and extend into an opening and into a recess in the hub of the wheel. Further, the spring retainers have clips that are configured to pass into the opening and abut the recess of the wheel. A medallion locking cup is provided that is smaller than the medallion well and which is configured to fit therein. The cup has spring retainer openings to allow the clips to flex for mounting and removing the medallion and cup onto the wheel. The cup has an abutting wall portion adjacent the spring retaining opening and the cup is rotated from inside the wheel to lock the medallion and cup onto the wheel with the abutting wall portions abutting the clips.

12 Claims, 2 Drawing Sheets

AUTOMOBILE MEDALLION ANTI-THEFT LOCKING DEVICE

BACKGROUND OF THE INVENTION

The invention relates generally to a locking device for an automobile wheel medallion and more particularly to a one-piece locking device for use with a conventional wheel medallion which encompasses all or a portion of the wheel grease cap.

Some automobiles are provided with expensive decorative wheel covers, or caps, formed separately from the wheel itself The cap can be dimensioned large enough to cover the entire wheel. In that case, the cover must be removed before the lug nuts can be loosened and the tire removed from the vehicle. On the other hand, the medallion can be dimensioned to cover only the hub of the wheel leaving the lug nuts exposed and making it unnecessary to remove the cover every time it is desired to remove the tire from the vehicle. This smaller cap is often referred to as a wheel medallion because it generally includes an insignia such as a trademark or an ornamental logo identifying the manufacturer of the vehicle.

Wheel medallions are subject to loss and, because they are small, accessible and valuable, wheel medallions are the subject of theft. Consequently, many prior art attempts have been made to lock the medallion to the wheel of the vehicle. These prior art attempts require a specially manufactured cap. They do not allow for the use of conventionally manufactured medallions which are the ones recognized as valuable. An example of a prior art attempt to provide an anti-theft hub cap would be to specially manufacture a pair of nested cups threaded together through the wheel hub wherein the outer cup can function as a cap covering the hub of the wheel. Another example would be a sleeve or housing that is bolted to the axle hub of the vehicle. A separate piece, a specially manufactured cap, has a key lock customized into the exterior surface of the medallion. The exterior lock is used to lock the medallion to the wheel from the face or front surface of the wheel. This type of lock is still susceptible to theft because it is accessible. Other attempts utilize an existing medallion but involve screw, bolt or lock arrangements drilled into the medallion. These arrangements are unsatisfactory because they deface the medallion and result in a reduction in its value.

One solution to locking wheel medallions is described in Applicant's U.S. Pat. No. 4,818,032, which provides a one-piece locking device or disk which captures the medallion clips on the opposite side of the wheel from the medallion. This locking device cannot accommodate medallions which are on flat wheel flanges, which have all or a portion of the grease cap extending into a medallion well.

It therefore would be advantageous to provide an anti-theft locking device that can be used with a conventional medallion which encompasses a grease cap and particularly one that will not deface the medallion.

SUMMARY OF THE INVENTION

The disadvantages of the prior art locking devices are overcome in accordance with the present invention by providing a wheel medallion locking device that is utilized inside a well of a conventional wheel medallion. The medallion is of the type that is held in place on the wheel by spring retainers that extend into an opening at the hub of a wheel and terminate with clips that abut a flange of a recess in the wheel wall. The medallion well also accommodates all or part of the wheel grease cap.

The medallion locking device is dimensioned to fit within the medallion well. The device has a cup shaped body with means for rotating the device in one end thereof. The cup shaped body is inserted into the medallion well in a first position which allows the medallion spring retainers to be flexed through openings in the cup shaped body as the medallion and medallion locking device are mounted onto the wheel. When the spring retainers snap into the wheel flange recess, the cup shaped body can be rotated to a second locked position in which portions of the cup shaped body abut the spring retainers to prevent the medallion from becoming loose or from being removed.

DESCRIPTION OF THE PREFERRED EMBODIMENT

Figure 1:
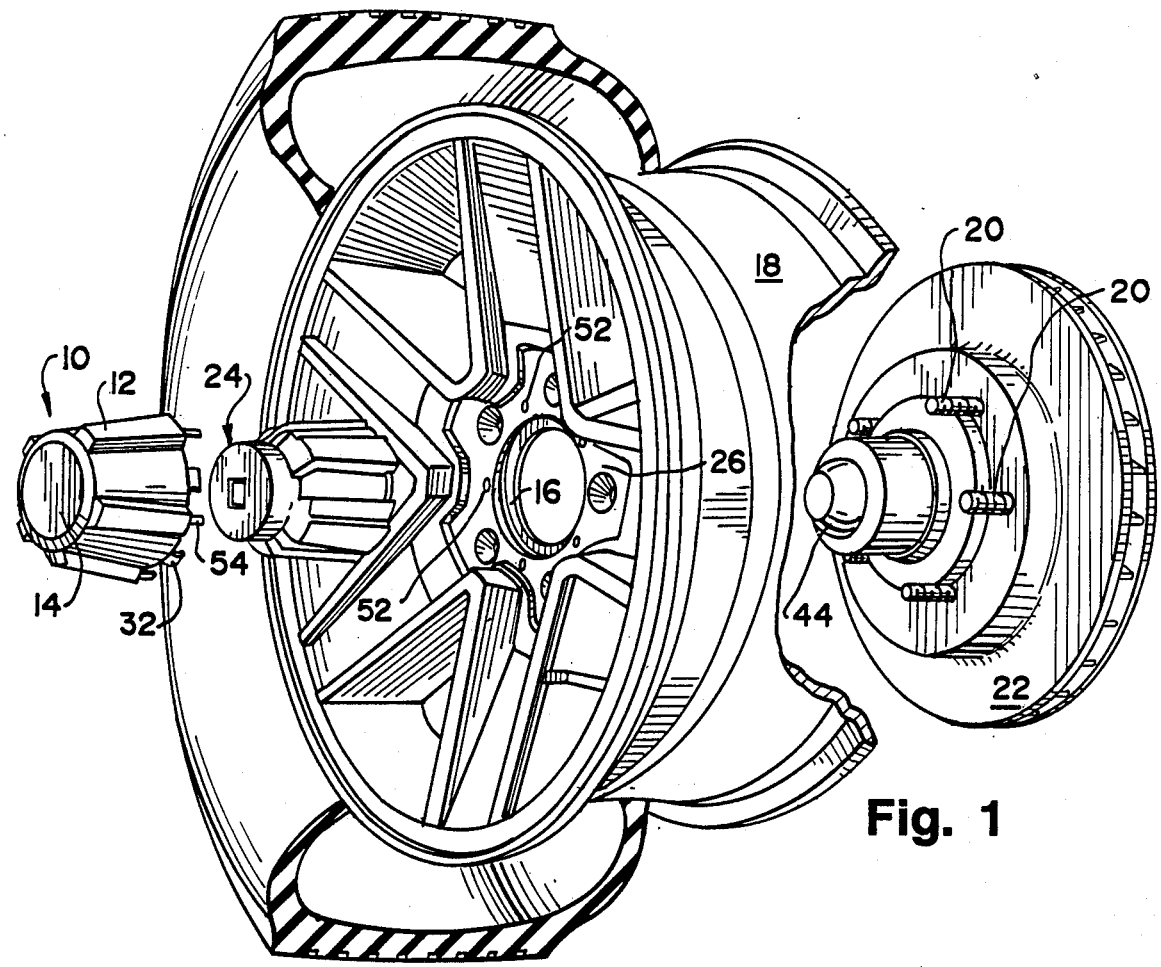
FIG. 1 is an exploded perspective of a wheel and wheel medallion illustrating the locking device of the present invention.

Referring to FIG. 1, a conventional wheel medallion is designated generally b the reference numeral 10. The medallion 10 has a body 12 into which a plate 14 is secured. The plate 14 contains an insignia, such as a trademark or logo, which generally identifies the manufacturer of a vehicle (not illustrated). The body and the plate are generally assembled as one piece from the separate pieces, however, the plate could be interchanged and a different plate could be substituted to identify a different manufacturer. Additionally, the invention does not require a two-piece medallion and a one-piece medallion is also contemplated.

The medallion 10 is located over an opening 16 in the hub of a wheel 18. The wheel 18 is a conventional wheel generally associated with a motor vehicle. The medallion 10 is sized such that lugs 20 of a vehicle rotor 22 are accessible when the medallion 10 is attached to the wheel 18. Therefore, the wheel 18 can be removed from the vehicle without having to first remove the medallion 10 from the wheel 18.

Figure 2:
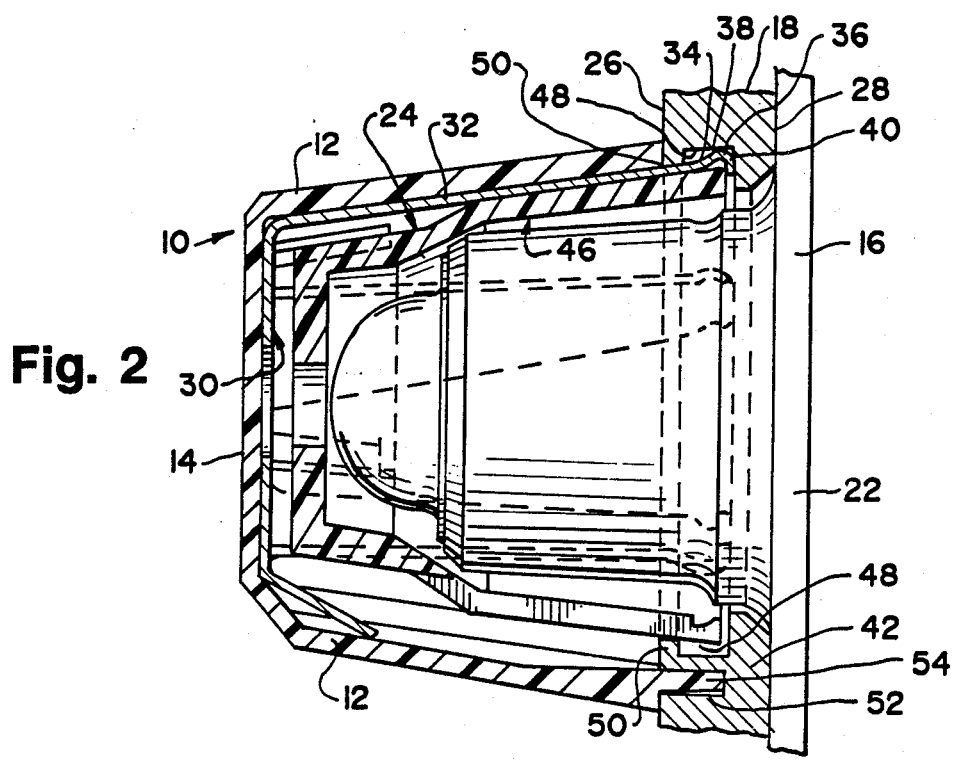
FIG. 2 is a side sectional view illustrating the present invention taken through the wheel medallion mounted on the vehicle wheel.

A locking device of the present invention is designated generally by the reference numeral 24. The medallion body 12 is illustrated mountable on a face or front surface 26 of the wheel 18 with the locking device 24 therein as illustrated in FIG. 2. A back surface 28 of the wheel 18 is mounted against the rotor 22 when the wheel is installed on the vehicle. In other words, when the medallion 10 with the locking device 24 is installed and the wheel 18 is bolted to the vehicle, the locking device 24 is inaccessible. A thief cannot remove the wheel medallion 10 from the wheel 18 unless he first removes the wheel from the vehicle. The time and effort required to remove the wheel from the vehicle will deter all but the most determined thief.

A medallion retainer is designated generally by the reference numeral 30. The medallion retainer 30 is secured to the medallion body 12, such as by adhesive, or can be integrally formed of the same plastic material as the medallion body 12. The medallion retainer 30 includes a plurality of spring retainers 32, which protrude from the retainer 30 beyond the medallion body 12 and are crimped at an end 34 to provide a clip 36. The clip 36 forms exterior beveled surfaces 38 and 40. Although the disclosed embodiment illustrates the medallion 10 as having five spring retainers 32, the concept of the invention is to have the clips held in place by the locking device 24 and the invention is not restricted to a particular number or configuration of spring retainers.

The mounting of the wheel 18 with the rear surface 28 against the rotor 22, does not allow room for the spring retainers 32 to extend beyond the surface 28. Further, the wheel 18 has a flat mounting flange 42, which requires that a grease cap and grease cap structure 44, extend into the medallion body 12 when the wheel 18 is mounted on the rotor 22. The locking device 24 includes a hollow interior well 46, which fits into the medallion body 12 and allows the grease cap 44 to also extend therein. Typically only the front wheels include the grease cap 44, however, the medallions 10 are all manufactured of a uniform configuration.

Since the spring retainers 32 cannot extend beyond the flange 42, the flange 42 includes an intermediate recess 48 into which the clips 36 of the spring retainers 32 snap fit. An upper lip 50 of the recess 48 serves as a bearing surface for the surfaces 38 and 40 of the clips 36. In the locked position, illustrated in FIG. 2, the locking device 24 prevents the spring retainers 32 from flexing, such that the medallion 10 cannot be removed from the wheel 18.

The wheel flange 42 also includes a plurality of locating, guide apertures or bores 52, into which a guide pin 54 formed or mounted onto the medallion body 12 is inserted. The pins 54 and the bores 52 locate the medallion 10 in the desired position on the wheel 18.

The medallion 10 is conventional and of the type generally supplied with some types of vehicles. Medallion dimensions, number of components, and material are not critical to the functioning of the present invention. The claimed invention requires only that the medallion be of the type having a plurality of protruding spring retainers supplied with clips that are configured to pass into the opening 16 in the wheel 18 and abut the recess 48 to hold the medallion body 12 in place on the wheel 18.

It can be seen that without a locking device this type of medallion can be easily stolen. The thief need only pull or pry the medallion from the wheel. Additionally, the medallion can be lost through vibration or jarring as, for example, when the vehicle is subjected to a rough road or pot holes. Also, the medallion 10 can become loose and cause a rattle as the vehicle is operated.

Figure 3:
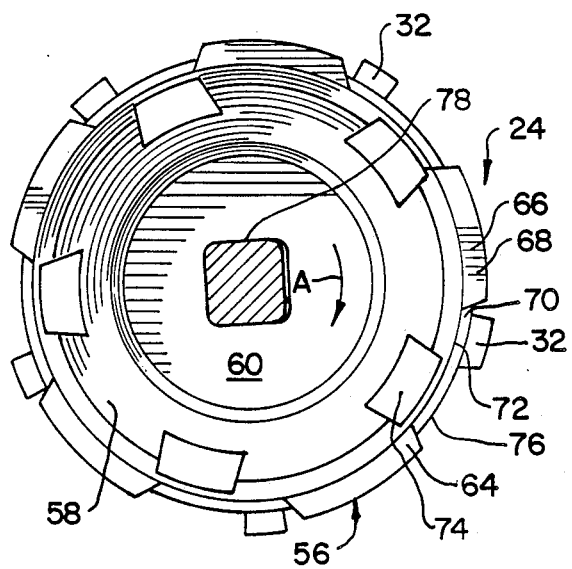
FIG. 3 is a bottom view of the locking device of the present invention in the locked position.
Figure 4:
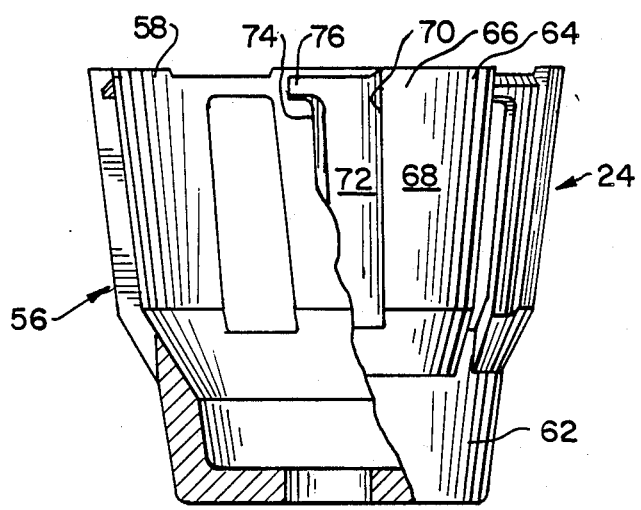
FIG. 4 is a partial side view of the locking device of the present invention.
Figure 5:
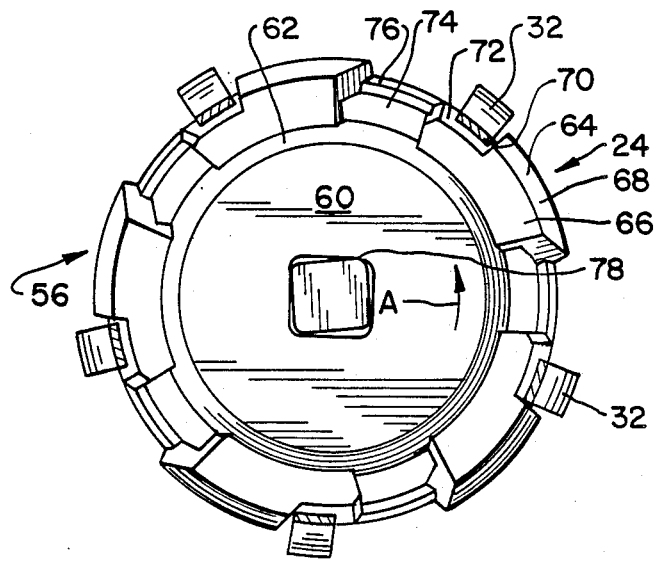
FIG. 5 is a bottom view of the locking device of the present invention in the locked position

The locking device 24 of the present invention provides a simple to use, yet secure, lock to prevent the theft of the wheel medallion 10. Referring now to FIGS. 3-5, the locking device 24 is shown from a bottom view in FIG. 3 and a top view in FIG. 5 with only the spring retainers 32 illustrated therewith. The locking device 24 is illustrated along in FIG. 4, with a portion cut away. The locking device 24 can be formed of plastic or a plastic like material, such as by molding.

The locking device 24 has a cup shaped body 56 to fit within the medallion body 12. The body 56 includes an open bottom end 58 and a closed top end 60. The body 56 includes a reduced diameter top portion 62, which clears the top structure of medallion retainer 30. The body 56 includes a multidimensioned skirt 64 depending from the top portion 62.

The skirt 64 includes a plurality of sections 66 spaced therearound, sized and configured to each mate with one of the spring retainers 32. Each section 66 includes a first wall portion 68, which includes a shoulder 70. The shoulder 70 forms a stop for the spring retainer 32 when it is moved to the locked position (rotated in the direction of the arrow A in FIG. 3). A second abutment wall portion 72 is stepped in from the shoulder 70 and forms an abutment to prevent the spring retainers 32 from being flexed and moved from the walls 48 (FIG. 2).

Adjacent the abutment wall portion 72 is a spring retainer opening 74, which allows the medallion 10 and locking device 24 to be mounted onto and released from the wheel 18. The spring retainer opening 74 allows the spring retainers 32 to flex so that the clips 36 can be inserted into or removed from the well 48. The bottom of the spring retainer opening 74 is formed by a cross member 76 (one of which is partially cut away in FIG. 4), which provides the support for the skirt 64 and the spring retainer opening 74.

The medallion 10 and the locking device 24 are installed with the wheel 18 removed from the vehicle. The medallion 10 is located in the opening 16 with the spring retainer 32 extending into the opening 16 and into the well 48 with the locking device 24 retained therein.

After the combination of the medallion 10 and the locking device 24 is inserted, the locking device 24 is rotated in the direction indicated by arrow A, in FIGS. 3 and 5, such that the abutment wall portions 72 are rotated to abut the spring retainers 32. The abutment wall portion 72 holds the clips 36 in their outward position to prevent the clips 36 from passing from the recess 48 and through the opening 16. Thus, the medallion 10 is securely locked in placed on the wheel 18.

An opening 78 and a mating tool (not shown) can be provided such that the mating tool, for example a drive ratchet extension, can be utilized to rotate the device 24. Use of such a tool will prevent scarring or other damage to the medallion 10 when the device 24 is rotated to either the locked or the unlocked condition. The opening 74 is not restricted to a specific dimension and a slot configuration in combination with a screwdriver, as a mating tool, is also possible. Alternatively, the device 24 can be provided with other rotating structures such as a nut. However, the rotating structure must be able to withstand the amount of torque necessary to secure the device 24 within the clips 36.

After the locking device 24 is installed and rotated to the locked condition, the wheel 18 is returned to the vehicle. Once installed the medallion 10 cannot be removed from the face or front surface 26 of the wheel 18. Consequently, the anti-theft locking device of the present invention provides a lock for wheel medallions that will prevent the loss of the expensive medallion while the wheel is attached to the vehicle and will also prevent the medallion 10 from vibrating or otherwise becoming loose.

Modification and variations of the present invention are possible in light of the above teachings. The outer surface of the portion 62 can include a flexible spring, detent or stop to prevent the locking device 24 from inadvertently being released from the locked position. Also, the locking device 24 could be formed as a unit with the medallion 10 and not as a separate part. The invention is not restricted to a particular material, although a hard plastic material is preferred. Further the wheel medallion is not restricted as to size or shape and can have the configuration of a wire wheel cover provided that the lug nuts are accessible with the medallion installed on the vehicle. Additionally, the number of spring retainers on the medallion can vary. For example, some vehicle medallions generally have six spring retainers. It is therefore to be understood that within the scope of the appended claims, the invention may be practiced otherwise than as specifically described.

What is claimed and desired to be secured by Letters Patent of the United States is:

1. A method of locking a wheel medallion to the wheel of a vehicle wherein the medallion is of the type having a plurality of protruding spring retainers supplied with clips that are configured to pass into an opening in the hub of the wheel having a hub flange and abut a recess in the hub flange such that the medallion is held in place on the wheel with a well in the medallion designed to accommodate a grease gap therein, said method comprising:
   providing a medallion locking cup having a dimension smaller than the medallion well and configured to fit therein;
   locating said locking cup inside the well of the medallion and within the confines of the clips; and
   rotating said locking cup to hold the clips in an outward position abutting the recess of the wheel and to prevent the clips from passing out of the recess through the opening so that the medallion is locked to the wheel.

2. A method of locking a wheel medallion to the wheel of a vehicle wherein the medallion is of the type having a plurality of protruding spring retainers supplied with clips that are configured to pass into an opening in the hub of the wheel having a hub flange and abut a recess in the hub flange such that the medallion is held in place on the wheel with a well in the medallion designed to accommodate a grease cap therein, said method comprising:
   providing a medallion locking cup having a dimension smaller than the medallion well and configured to fit therein;
   providing spring retainer openings in said locking cup so that said clips abut said spring retainer openings when said cup is in the unlocked condition for inserting said medallion into or removing said medallion from the confines of said hub recess;
   providing an abutting wall portion on said cup adjacent said spring retainer openings and rotating said cup to locate said abutting wall portion within the clips so that the clips are locked in an outward position abutting the wheel recess to prevent the clips from passing out of the recess and through the opening;
   locating said locking cup inside the well of the medallion and within the confines of the clips; and
   positioning said locking cup to hold the clips in an outward position abutting the recess of the wheel and to prevent the clips from passing out of the recess through the opening so that the medallion is locked to the wheel.

3. The method as defined in claim 2 wherein said cup includes rotating means for turning said cup to lock or unlock the medallion.

4. The method as defined in claim 3 wherein said rotating means include an opening and further providing a mating tool; and
   inserting said tool into said opening to turn said cup to lock or unlock the medallion.

5. The method as defined in claim 2 including providing a shoulder on said cup to stop said cup in the locked position with said abutting wall portion abutting said clips.

6. An anti-theft locking device for securing a medallion to the wheel of a vehicle wherein the medallion is of the type having a plurality of protruding spring retainers supplied with clips that are configured to pass into an opening at the hub of the wheel and into a recess in the hub and abut the recess of the wheel such that the medallion is held in place on the wheel with a well in the medallion designed to accommodate a grease cap therein, said device comprising:
   a medallion locking cup dimensioned smaller than the medallion well, said cup configured to fit into the well of the medallion and within the confines of the protruding spring retainers such that in the unlocked condition each of said clips can flex through a portion of said cup to allow said medallion to be inserted into or removed from the wheel and when said cup is in the locked condition a portion of said cup is positioned within and abutting the clips to hold the clips in an outward position abutting the wheel recess and to prevent the clips from passing out of the recess and through the opening so that the medallion is locked to the wheel.

7. The anti-theft locking device as defined in claim 6 including rotating means for turning said cup to lock or unlock the medallion.

8. The anti-theft locking device as defined in claim 7 wherein said rotating means include an opening in said cup that cooperates with a mating tool for rotating said cup.

9. The anti-theft locking device as defined in claim 7 wherein said rotating means include a nut located on said cup that cooperates with a mating tool for rotating said cup.

10. The anti-theft locking device as defined in claim 6 wherein said cup is plastic.

11. The anti-theft locking device as defined in claim 6 wherein said cup includes a spring retainer opening abutting each of said clips in the unlocked position and an abutting wall portion abutting each of said clips in the locked position.

12. The anti-theft locking device as defined in claim 11 herein said cup includes a shoulder to stop said cup with said abutting wall portion abutting said clips.

* * * * *